United States Patent
Steffens et al.

(10) Patent No.: US 7,195,299 B2
(45) Date of Patent: Mar. 27, 2007

(54) CARGO COMPARTMENT ORGANIZER

(75) Inventors: Charles J. Steffens, Ada, MI (US); James P. Sheeran, Wyoming, MI (US)

(73) Assignee: Steffens Enterprises, Inc., Caledonia, MI (US)

( * ) Notice: Subject to any disclaimer, the term of this patent is extended or adjusted under 35 U.S.C. 154(b) by 0 days.

(21) Appl. No.: 11/368,207

(22) Filed: Mar. 3, 2006

(65) Prior Publication Data

US 2006/0145503 A1 Jul. 6, 2006

Related U.S. Application Data

(62) Division of application No. 10/361,339, filed on Feb. 10, 2003, now Pat. No. 7,036,861.

(51) Int. Cl.
    *B60N 3/12* (2006.01)
(52) U.S. Cl. ..................... 296/37.6; 224/404
(58) Field of Classification Search ............... 296/37.6; 224/404
    See application file for complete search history.

(56) References Cited

U.S. PATENT DOCUMENTS

| | | | |
|---|---|---|---|
| 4,550,945 A | 11/1985 | Englehardt | |
| 4,629,390 A | 12/1986 | Burke | |
| 4,946,217 A | 8/1990 | Steffens et al. | |
| 5,028,198 A * | 7/1991 | Buhr | 414/542 |
| 5,186,510 A | 2/1993 | Stapp | |
| 5,427,428 A | 6/1995 | Ericson | |
| 5,525,026 A * | 6/1996 | DeMonte et al. | 414/542 |
| 5,538,386 A * | 7/1996 | Scheibel | 414/467 |
| 5,580,211 A * | 12/1996 | Mengel | 414/812 |
| 5,634,577 A | 6/1997 | Pearson, Jr. et al. | |
| 5,716,184 A * | 2/1998 | Lowe et al. | 414/398 |
| 5,795,031 A * | 8/1998 | Hagenbuch et al. | 298/17.6 |
| 5,823,605 A | 10/1998 | Seargeant | |
| 5,833,114 A | 11/1998 | Linnell | |
| 5,839,872 A * | 11/1998 | Goto et al. | 414/280 |
| 5,915,913 A * | 6/1999 | Greenlaw et al. | 414/679 |
| 5,961,173 A | 10/1999 | Repetti | |
| 6,036,258 A * | 3/2000 | Clare et al. | 296/187.12 |
| 6,095,588 A | 8/2000 | Rodosta | |
| 6,170,900 B1 | 1/2001 | Kooiker | |
| 6,203,086 B1* | 3/2001 | Dirks et al. | 296/37.6 |
| 6,237,211 B1* | 5/2001 | Clare et al. | 29/434 |
| 6,321,819 B1 | 11/2001 | Copp et al. | |
| 6,435,369 B1* | 8/2002 | Poursayadi | 221/185 |

(Continued)

*Primary Examiner*—Joe Dillon, Jr.
(74) *Attorney, Agent, or Firm*—Warner Norcross & Judd LLP

(57) ABSTRACT

A storage box for a cargo bay of a vehicle including a conveyor on which items, e.g., tools and materials, are stored. The conveyor is actuatable to move the items in a pre-selected direction, preferably toward the side or rear of the vehicle cargo bay to provide easy access to the items. In another aspect, the storage box includes fold-out shelving. The shelving includes multiple panels hinged together. A first panel is hingedly connected to an intermediate panel, which is hingedly connected to a second panel, which is pivotally connected to the storage box. The panels are operable in (a) a collapsed mode, where the panels fold substantially vertically against one another, and (b) an extended mode, where the first panel moves outwardly to a substantially vertical position and the intermediate and pivot panel pivot downward to a substantially horizontal position.

19 Claims, 7 Drawing Sheets

U.S. PATENT DOCUMENTS

| | | |
|---|---|---|
| 6,454,148 B1 | 9/2002 | Cook |
| 6,460,744 B2 | 10/2002 | Lance et al. |
| 6,474,521 B1 | 11/2002 | Young |
| 6,565,141 B1 | 5/2003 | Steffens et al. |
| 6,929,303 B1 | 8/2005 | Sharples |
| 6,976,724 B2 | 12/2005 | Wheatley |
| 7,036,861 B2 * | 5/2006 | Steffens et al. ............ 296/37.6 |
| 2002/0034430 A1 | 3/2002 | Sotiroff et al. |
| 2004/0155082 A1 | 8/2004 | Steffens |

* cited by examiner

CARGO COMPARTMENT ORGANIZER

This application is a division of U.S. application Ser. No. 10/361,339 filed Feb. 10, 2003 (now U.S. Pat. No. 7,036,861), which is hereby incorporated by reference.

BACKGROUND

The present invention relates to toolboxes, and more particularly to toolboxes mounted in the cargo bay of a vehicle.

Pick-up trucks and vehicles having open cargo bays are used extensively for transporting purposes. To protect tools and materials transported in a pick-up bed or an open cargo bay from both theft and the elements, it is common to use a toolbox, also referred to as a "utility box," that includes an enclosed storage space within which items may be stored. Most toolboxes include a door that provides access to the storage space.

Typically, the toolboxes mount across the pick-up bed between the pick-up bed side panels, or along the side panels. These configurations enable a user to access the toolbox door, by standing along side the side panels, rather than having to enter the pick-up bed.

Often, a toolbox includes one or more storage bins that subdivide the storage space and improve organization within the box. Most storage bins are slidably mounted on ledges or rails in the toolbox to facilitate access to items stored under the bins.

Although conventional pick-up bed toolboxes provide a way to protect, access and organize items stored therein, they suffer several shortcomings. First, it is common for items stored in a toolbox to shift in transit, particularly if the vehicle traverses a rugged construction site. In some cases, an item that was placed in the toolbox on one side, or the front, of the pick-up bed may shift in the toolbox to the other side or rear of the pick-up bed. Accordingly, the user must go to the other side of the vehicle or enter the pick-up bed to retrieve the item. This can be frustrating, and usually wastes valuable work time. Second, a user may place an item in a toolbox on one side of a pick-up bed, and later desire to retrieve the item from the other side of the pick-up bed. With a conventional toolbox, the user has no choice but to go to the side that the item was originally placed in the toolbox to retrieve it. Third, where toolboxes are mounted in pick-ups or vehicles having tall ride heights, a user frequently accesses and uses only the storage space immediately adjacent the pick-up side panels because it is difficult to reach over the side panels and access the center of the toolbox. Thus, many times the storage capacity of the toolbox is underutilized.

Furthermore, conventional toolbox storage bins frequently make it difficult to store large items, e.g., large power tools, in the toolbox. Typically, the boxes must be removed from the toolbox to accommodate large items. Often, the bins are lost or forgotten after removal and therefore no longer useful. Additionally, debris, such as dirt or nails, collects on the ledges or rails that support the bins, inhibits the movablility of the bins, and damages the interior of the toolbox.

SUMMARY OF THE INVENTION

The aforementioned problems are overcome in the present invention wherein a utility or toolbox is provided that includes a conveyor. The conveyor is mounted between opposite sides of the toolbox. An actuator enables a user to convey items disposed in the toolbox and on the conveyor in a pre-selected direction, for example, toward the user at either opposing ends of the toolbox.

In one embodiment, the conveyor is driven by a motor that is activated by controls mounted near opposing sides of the toolbox. Accordingly, a user may engage the conveyor regardless of the side of the box at which he or she is located.

In another embodiment, the conveyor includes a belt having a continuous tensioner to keep the belt taut. With the tension, the belt is driven with sufficient traction to withstand slippage on drive rollers or drums when heavy items are disposed on the conveyor.

In another aspect of the present invention, a pick-up bed toolbox is provided that includes a fold-out shelving unit. The shelving unit includes multiple panels hingably connected to one another. One end panel, a "slider panel," may be slidably mounted to the toolbox. An opposite end panel, a "pivot panel," is pivotally mounted to the toolbox. An intermediate panel is mounted between the end panels. The panels are operable in a collapsed mode, where the panels fold-up and out of the way in the toolbox, and an extended mode, where the slider panel slides to a vertical position, and the intermediate panel and pivot panel fold-out to horizontal positions forming a shelf. Optionally, the slider panel includes a storage tray oriented relative to the intermediate and pivot panels so that it does not interfere with the folding of the panels in the collapsed mode.

The present invention provides a utility or toolbox with increased functionality and accessibility. With the conveyor, a user may easily access contents of the toolbox from any side or end of the pick-up bed or cargo bay, regardless of whether the contents shifted in transit or where the contents were placed after the last use. In turn, this reduces the time spent accessing items in the toolbox. Furthermore, the improved shelving of the present invention provides on-demand subdivision of toolbox storage space. It also easily folds out of the way, enabling a user to take full advantage of the storage space without removing the shelving unit altogether from the toolbox.

These and other objects, advantages and features of the invention will be more readily understood and appreciated by reference to the detailed description of the invention and the drawings.

DETAILED DESCRIPTION OF THE INVENTION

I. Overview

Figure 1:
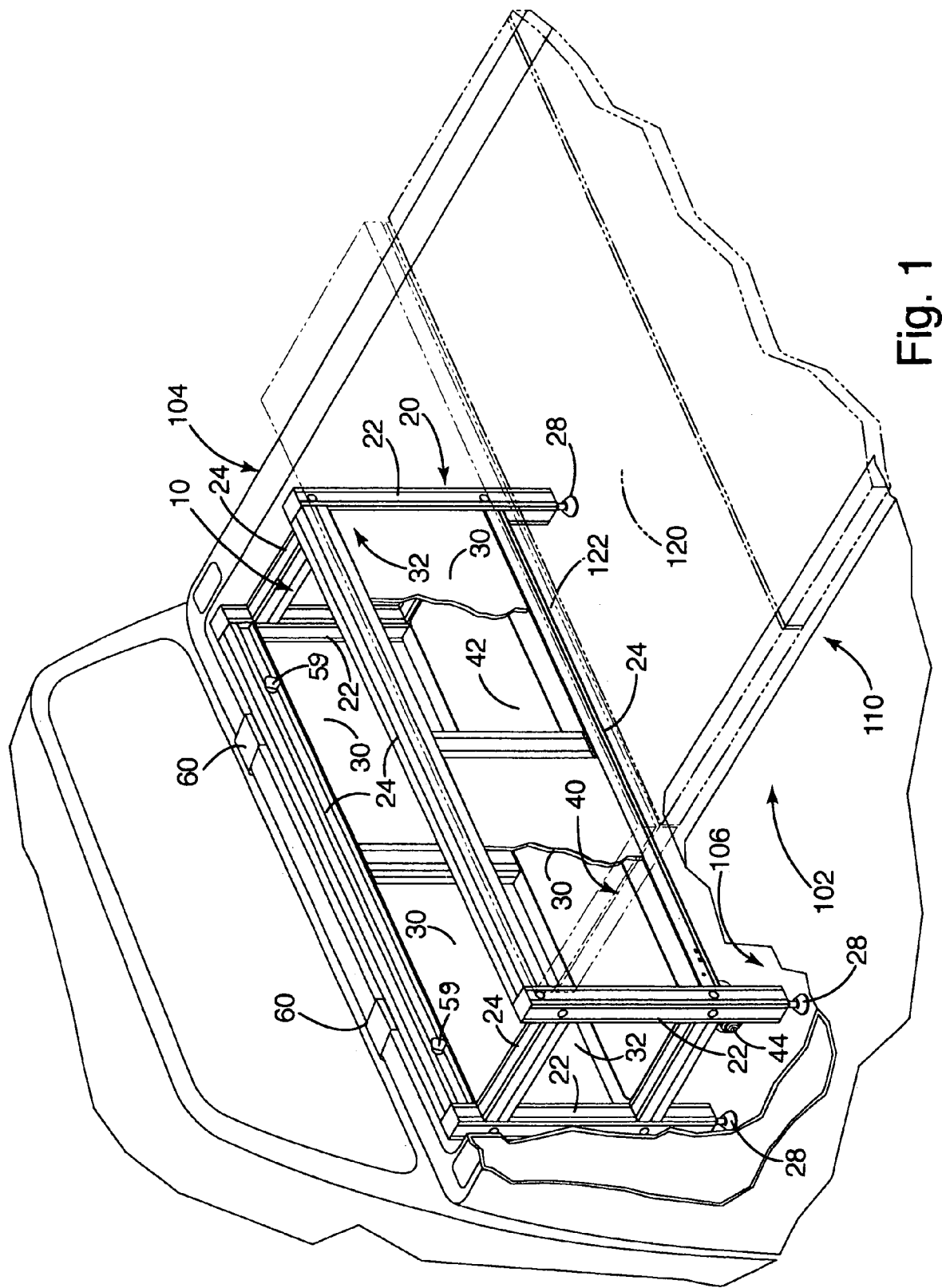
FIG. 1 is a perspective view of the toolbox of the present invention shown in conjunction with a pick-up bed and a foldable bed cover.

A toolbox constructed in accordance with a first embodiment of the invention is illustrated in the drawings and generally designated 10. With reference to FIG. 1, the toolbox 10 is shown in conjunction with a conventional folding cargo cover 120, having a panel 122 that opens to provide access to the interior of the toolbox. The toolbox generally includes a frame 20 including multiple vertical support members 22 and horizontal members 24. Sides 30 and ends 32 are secured to the frame to define storage space. A conveyor 40 is mounted to the frame 20, preferably near the bottom of the frame, to form a floor of the toolbox 10.

Figure 5:
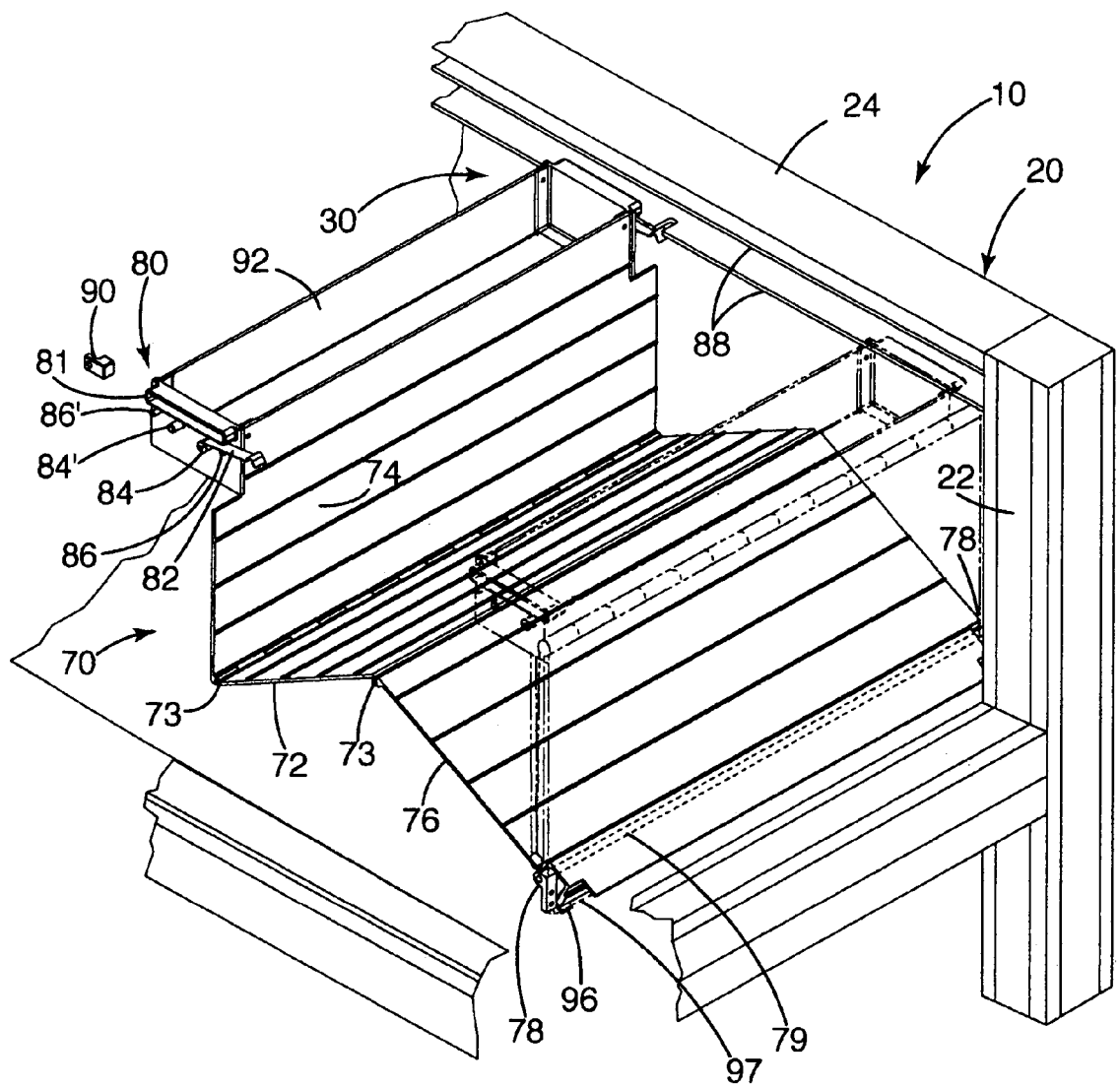
FIG. 5 is a cut away view of the toolbox including a fold-out shelving unit in an extended configuration shown in full lines and a collapsed configuration shown in broken lines.
Figure 6:
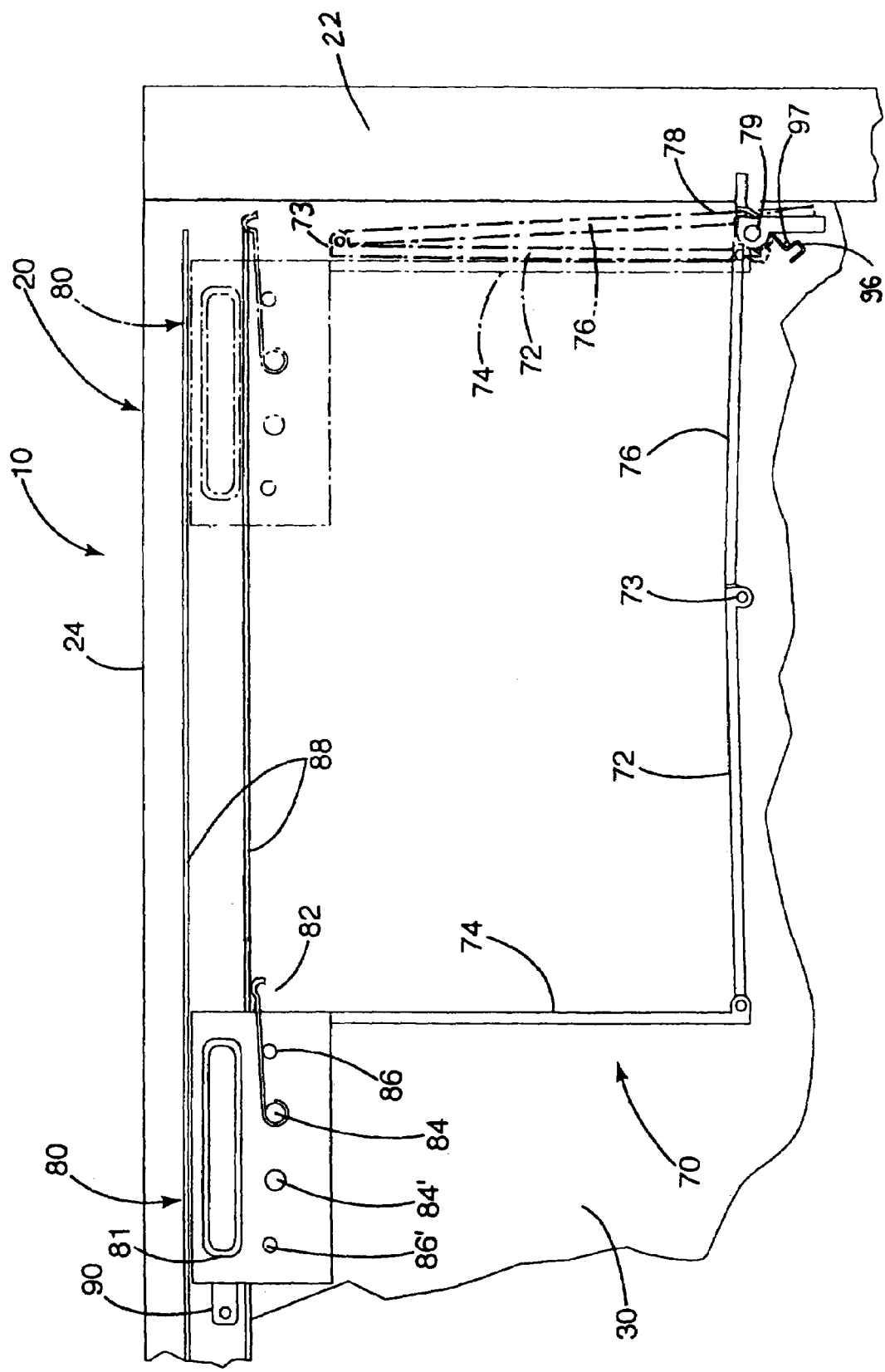
FIG. 6 is a side elevational view of the fold-out shelving unit in an extended configuration in full lines and a collapsed configuration shown in broken lines.

With reference to FIGS. 5 and 6, the toolbox includes a fold-out shelving unit 70 mounted in the frame 20 of the toolbox 10. The fold-out shelving 70 includes multiple panels 72, 74, 76, hinged to one another and extendable from a collapsed mode to an extended mode, in which the intermediate panel 72 and pivot panel 76 form a support surface on which items may be stored. The fold-out shelving unit 70 may installed in a toolbox with the conveyor of the present invention as desired.

In the drawings, the toolbox shown is a crossover design that extends between the side panels 102, 104 of the pick-up bed 100. However, the present invention also is suitable for other pick-up bed toolbox designs, including a side mount toolbox design, where the toolbox is mounted along and parallel to one or more of the side panels, and a bed design, where the toolbox is mounted between the side panels on the bottom of the pick-up bed 106. Furthermore, although shown in connection with a folding cargo cover 120, the present invention is well suited for stand-alone toolboxes including one or more doors or covers that provide access to the interior of the toolbox. Finally, although the toolbox 10 is shown mounted in a pick-up bed, it is also well suited for a variety of other cargo bays, for example, cargo bays in or on hybrid sport utility vehicles, vans, trailers, tractors and other vehicles.

II. Toolbox Construction and Conveyor Assembly

The toolbox and conveyor assembly of the present invention will now be described in more detail with reference to FIGS. 1–4. The toolbox as shown includes a frame having multiple vertical members 22 forming the corners of the frame 20. The vertical members 22 are connected to one another with the horizontal members 24. The vertical and horizontal members may be of an extruded construction including slots or holes. These slots or holes are optionally modular to enable a user to adjust the position of the horizontal elements 24 relative to the vertical elements or vice versa or include additional shelving or accessories within the toolbox 10. As shown in FIG. 1, side panels 30 and end panels 32 may be joined with the vertical and/or horizontal members 22, 24, as desired, to form an enclosed storage space within the frame.

The vertical members 22 may include feet 28 that extend from the vertical members 22. The feet 28 optionally are selectively extended and retracted from the vertical members 22 to adjust and level the frame relative to the pick-up bed bottom 106 against which the feet are positioned. For example, the feet may include a bolt portion that is threadably received and fixedly disposed in the vertical member 22.

The frame further includes brackets 60 that secure the frame 20 to the pick-up bed 100 and prevent it from tipping or moving relative to the pick-up bed. The brackets 60 may be secured to the frame 20 with any conventional fasteners including bolts, screws, welds, clamps and the like.

As shown in particular detail in FIG. 1, the frame 20 is shown mounted in a pick-up bed with the panel 122 of the folding cover 120 adapted to close over the top of the frame 10 and enclose the storage space defined within the frame. The folding cover including this panel is generally well known, and, therefore, will not be described in detail. For example, the folding cover may be constructed in accordance with U.S. Pat. No. 6,422,635 to Steffens et al, issued Jul. 23, 2002 and entitled "Folding Cargo Bay Cover for Pickup Truck," the disclosure of which is incorporated by reference.

As will be appreciated, although shown in conjunction with a folding cover, the toolbox of the present invention may be of other conventional pick-up bed toolbox designs. For example, the toolbox may be a frameless, stand-alone toolbox, including extending members, or "wings," that rest directly on the side panels 102 and/or 104 and one or more doors that provide access to the interior of the toolbox. Additionally, the toolbox may be suspended entirely above the pick-up bed floor 106.

Figure 2:
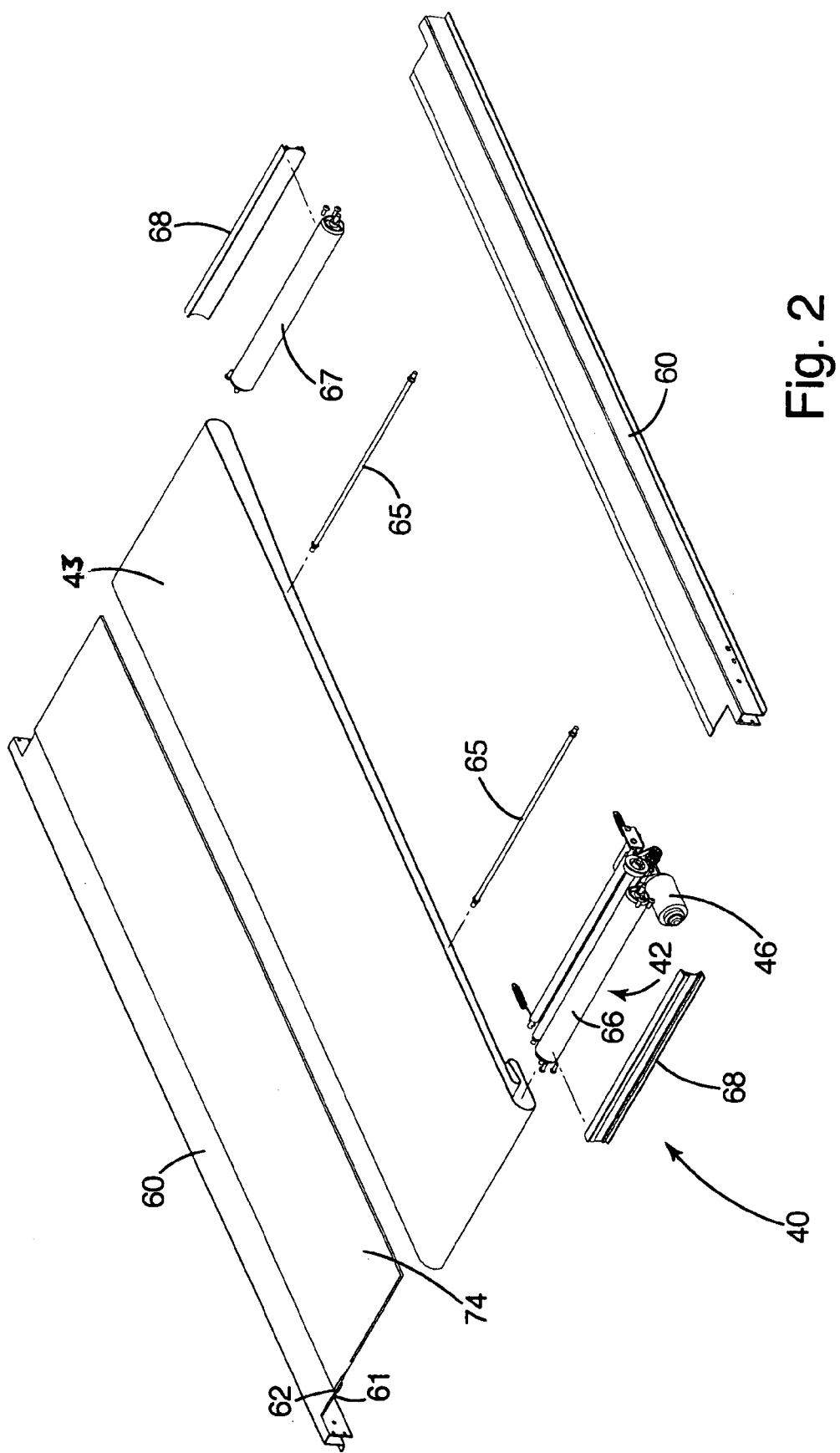
FIG. 2 is an exploded view of the conveyor.
Figure 3:
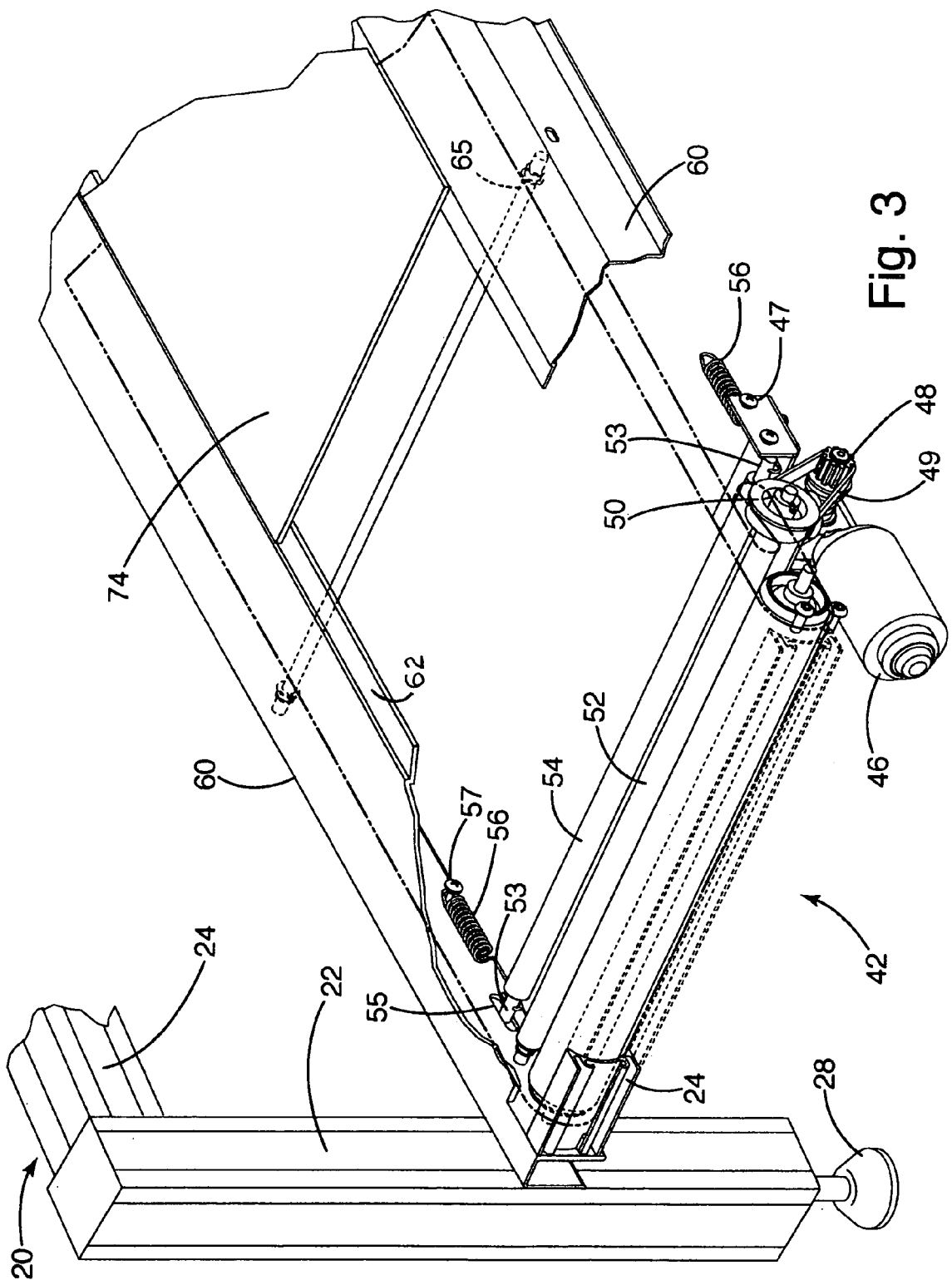
FIG. 3 is a perspective view of the drive assembly of the conveyor.

As shown in FIGS. 1–3, a conveyor assembly 40 is mounted within the frame. In general, the conveyor assembly 40 is mounted in the lower most portion of the frame or toolbox 10 to form the floor thereof. The positioning of the conveyor assembly 40 relative to the bed 106 may be adjusted by adjusting the position of the horizontal members 24 relative to the vertical members. As shown in FIG. 2, the conveyor assembly includes a belt 43 that is driven by the drive assembly 42. The belt 43 and drive assembly 42 are mounted to the side rails 60 or the members 22 or 24.

The belt 43 extends between opposing ends of the frame 20, and, for example, between opposite side panels 102 and 104 of the pick-up bed 100. Optionally, in other toolbox designs, for example the side mount and bed designs, the conveyor may run parallel to the side panels 102, 104 and/or along the bed 106, respectively. As shown in FIG. 2, the belt is a continuous belt that wraps around end drums 66, 67 and serpentines through the drive assembly 42.

The end drums 66 and 67 are rotatably mounted to the side rails 60. Adjacent the end drums 66 and 67, optional shields 68 are disposed. The shields prevent debris from passing below the belt and into the drive assembly 42.

Referring to FIGS. 2 and 3, the belt 43 is supported between the end drums by the side rails 60 and/or the support plate 74. The side rails 60 may mount directly to the vertical members 22 of the frame 20 or, alternatively, may mount to the horizontal members 24. The side rails 60 include a side rail plate 61 that extends inwardly from the side rails toward the belt. The side rail plate 61 defines a recess 62 within which the support plate 74 rests and is supported. The support plate 74 may be joined to the side rail 61 in the recess 62 with any conventional means, e.g., adhesives, tape, welding, screwing and the like.

The conveyor assembly 40 may further include belt guides 65 that are disposed under the lower-most portion of the belt and hold that portion up to prevent it from drooping below the side rails 60 or any other portion of the toolbox or conveyor assembly as desired. As desired, additional motor rollers and guides may be used in connection with the toolbox conveyor assembly.

As shown in FIGS. 2 and 3, the drive assembly 42 includes a motor 46 that is mounted to the side rail 60 and/or the horizontal member 24 with a mounting bracket 47 using conventional fastening means. The motor 46 rotates the drive gear 48, which transfers rotation to the drive belt 49, the driven gear 50 and subsequently the drive roller 52. The drive roller 52 is rotatably mounted to the side rails in a conventional manner and rotates when driven by the motor. Upon rotation, the roller 52 urges the belt 43 to scroll in a desired direction conveying articles (not shown) disposed on the belt 43 toward one of the ends of the frame 20. If the motor continues to scroll the belt, one or more articles on the belt may accumulate at the end of the frame. Optionally, the motor is reversible so that it can operate in forward and reverse modes thereby motivating the belt 43 to scroll toward either side of the pick-up bed side panels 102 or 104 or the ends of the toolbox 10, as desired. The drive gear 48, driven gear 50 and drive belt 49 may be covered with a cover (not shown) to prevent debris from affecting these components.

The drive assembly 42 optionally includes a tension roller 54 to maintain the belt 42 in continuous tension. The tension roller 54 includes an axle 53 that mounts within slots 55 defined by the side rails 60. Tension roller springs 56 are mounted to the side rails 60 with a tension roller spring screw 57. The springs 56 may be pre-biased to pull the conveyor belt 43 wrapped around the tension roller 54 taut. The axles 53 are mounted in the slots 55 to provide slack in the belt 43.

The motor 46 is preferably actuated by one or more controls 59 that are mounted to the frame 20 or other components of the toolbox 10 in desired locations. In one embodiment, two controls 59 are provided, with one adjacent each of the side panels 102 and 104. Optionally, the controls 59 may be substituted with a remote control that operates the motor via wireless communication.

Figure 4:
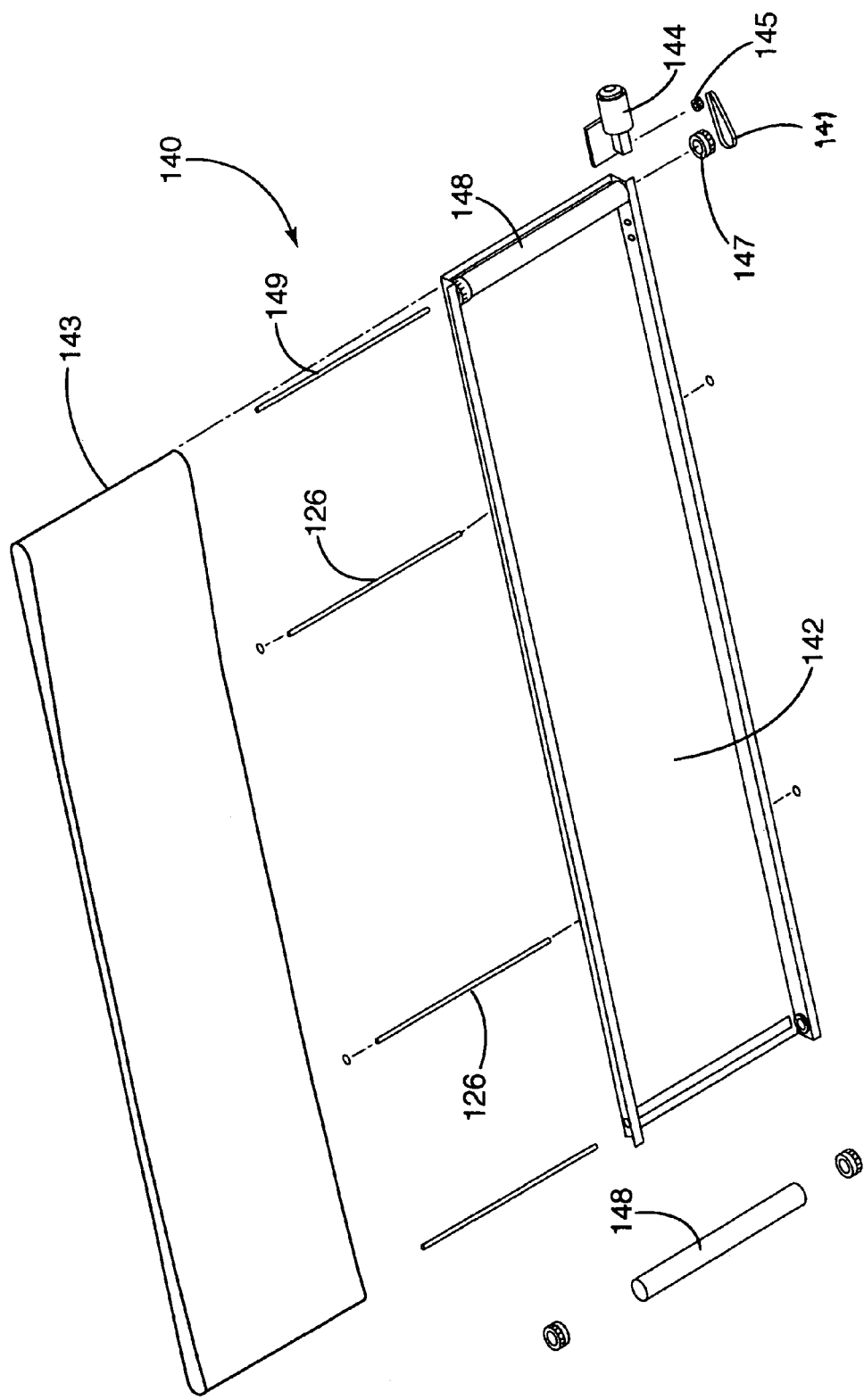
FIG. 4 is an exploded view of an alternative embodiment of the conveyor.

An alternative construction for the toolbox conveyor assembly of the present invention is illustrated in FIG. 4, which shows the alternate conveyor from its underside. This alternative conveyor system 140 mounts to the frame as described in the embodiment above, and includes a continuous belt 143 mounted around drums 148. The drums are rotatably mounted on axles 148 that mount within a support pan 142. This support pan 142 is further mounted to the frame 20 as in the embodiment described above. A motor 44 drives drive gear 145, which in turn rotates the belt 141 and drives the driven drum gear 147 to rotate the drum 148. The motor operates under the same principles and is controlled by the controls 59 as in the embodiment described above to carry items on the conveyor belt 143 toward a user.

The construction of the conveyor assembly of the present invention may be further modified as desired. For example, the continuous belt may be replaced with a scrolling belt design where the belt coils up on rotatable end drums disposed at opposite sides of the frame. Alternatively, the continuous belt may replace with multiple rollers.

III. Toolbox Fold-Out Shelving

The toolbox fold-out shelving of the present invention will now be described in more detail with reference to FIGS. 5–6. The fold-out shelving unit 70 includes a slider panel 74, intermediate panel 72 and a pivot panel 76. The slider panel 74 and pivot panel 76 are connected to the intermediate panel 72 with hinges 73. The panels preferably are constructed of extruded aluminum, however, they may be constructed of any metal, plastic or other material as desired.

The pivot panel 76 is hingedly connected to intermediate panel 72 with hinge 73, and pivotally mounted to vertical members 22, with mounting brackets 78. Preferably, the pivot panel 76 is mounted to an axle 79 that is mounted to brackets 78. The panel 76 rotates relative to the axle 79, brackets 78 or both. Optionally, the pivot panel 76 includes an initiator spring 96 that biases against an initiator spring rod 97. As shown in FIG. 6, the initiator spring is biased when the pivoting panel 76 is in a horizontal position. This bias urges the pivot panel 76 to pivot upward. In effect, this bias initially assists a user in folding the shelving unit to a collapsed or closed configuration.

The slider panel 74 is hingedly connected to intermediate panel 72 with hinge 73, and slidably mounted to the shelving guide rails 88 via slide guide 80. Although referred to herein as a slider panel, the panel 74 may be free from sliding or other engagement with other components of the toolbox 10, and simply fold with respect to the intermediate panel 72. With reference to FIGS. 5 and 6, the slide guide 80 includes a guide member 81 that interfits within the shelving guide rails 88, which are joined with or defined by a horizontal member 24. The guide member 81 slides between the rails 88 to allow the fold-out shelf unit to operate as described below.

The guide member 81 of the sliding member 80 also may include a mechanism to hold the shelving unit in a collapsed configuration. Specifically, as shown in FIGS. 5 and 6, the slide guide 80 includes a post 84 on which a detent spring 82 is mounted. A pin 86 biases the detent spring upward against the lower most guide rail (FIG. 5) when the fold-out shelf unit is in an extended position. The slide guide may include a pin 86' and a post 84' opposite the pin 86 and post 84 so that the spring 82 may be mounted in reverse and the same slide guide used on the opposite side of the shelf. When the fold-out shelf unit is collapsed or folded into the vertical orientation (shown in broken lines in FIG. 5), the detent spring 82 biases upward to secure over the end of the lower most guide rail 88 and hold the unit 70 in a collapsed configuration.

Optionally, a stop member 90 is disposed within the guide rails 88 to stop the fold-out shelving unit from extending beyond a pre-selected position. Further optionally, the slide guide is modified to mount a holding tray 92 to the sliding panel 74. As desired, the tray 92 may be deleted from the fold-out shelf unit and the slide guide 80 modified accordingly. Additionally, multiple shelving units 70 may be installed on opposite sides of the toolbox 10 as desired to subdivide the general storage space of the toolbox and allow a user to organize his or her tools or materials within the toolbox 10.

In operation, the fold-out shelving unit shown in FIGS. 5 and 6 is held in a collapsed configuration (shown in broken lines) by the detent spring 82. The pivot panel 76, slider panel 74 and intermediate panel 72 are substantially vertical in this collapsed configuration and held out of the way to provide access to the interior of the toolbox 10. To extend the fold-out shelf unit and subdivide the toolbox 10, a user pushes the slider panel 74 away from the side 32 of the toolbox. Initially, the user must push with sufficient force to coil the detent spring downward, thereby disengaging it from the lower most guide rail 88. FIG. 4 shows the fold-out shelving unit 70 as it begins to unfold in an accordion-like manner. As the shelving unit is extended, the guide member 81 of the slide guide 80 slides within the guide rails 88. The slide guide 80 continues to slide in the guide rails 88 until the sliding panel 74 is disposed in a substantially vertical position and the intermediate panel and pivot panel 76 are disposed in substantially horizontal positions; the guide stop 90 preferably defines the point at which the slide guide 80 can no longer slide and the panels attain these positions.

FIG. 5 shows the fold-out shelving unit in a fully extended configuration. Items may be stored on the intermediate and/or pivot panels in this configuration. Preferably, the orientation of the hinges 73 prevents the intermediate and pivot panels from folding downward and collapsing.

Figure 7:
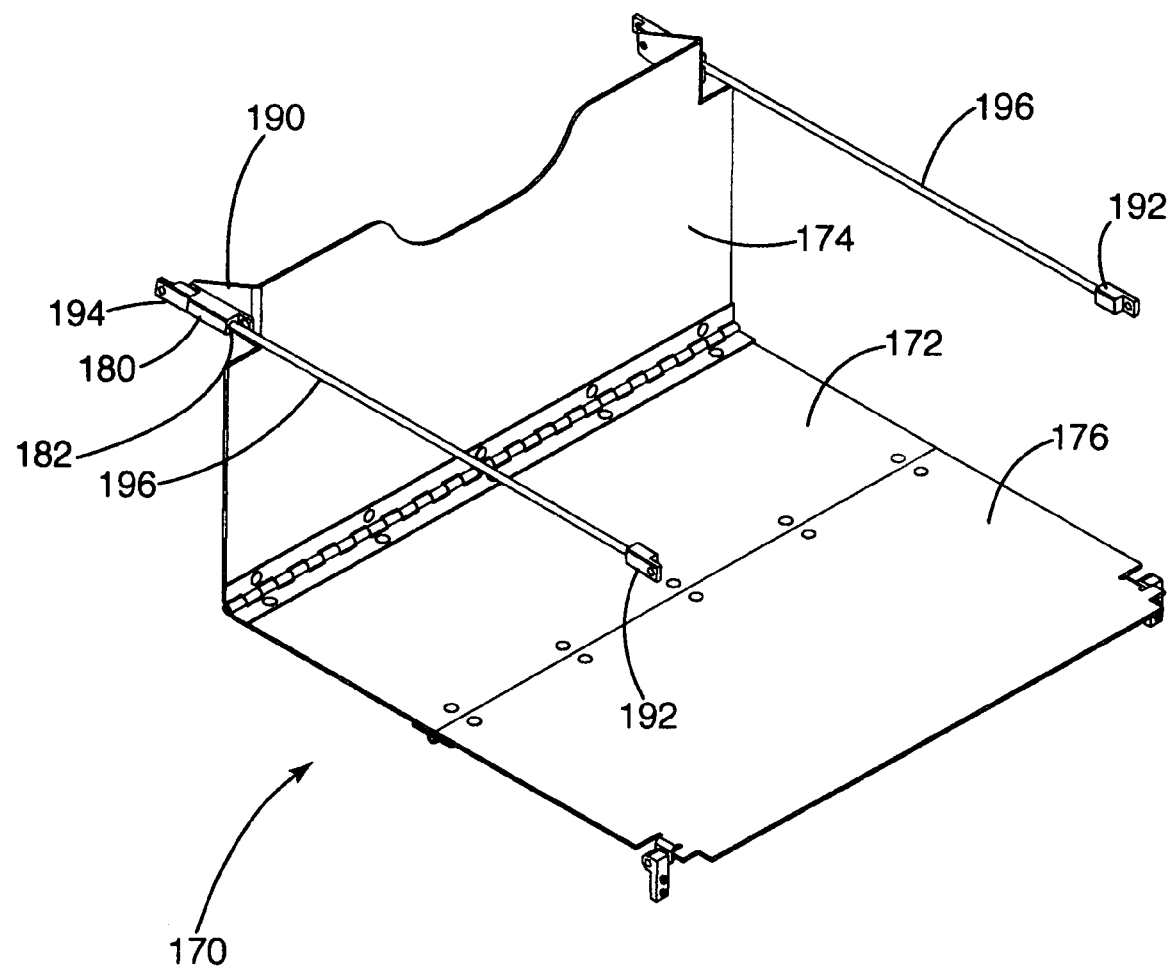
FIG. 7 is a perspective view of an alternative embodiment of the fold-out shelving unit.

Other configurations of hinges and panels of the shelving unit may be substituted as desired. For example FIG. 7 illustrates an alternative embodiment of the fold-out shelving unit 170 that includes many of the same elements of the embodiment described above, including the pivot panel 176, the intermediate panel 172 and the slider panel 174. In this embodiment, however, the slide guide 180 mounts to a tab 190 extending from the slider panel 174. A slide rod 196 is secured to the horizontal members 24 of the frame 20 with brackets 192 and 194. The slide rod 196 interfits within a slide rod hole 182 defined by the slide guide 180. The slide guide 180 slides on the slide rod 196 allowing the fold-out shelf unit to extend and collapse as described above.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A storage box assembly for use in a cargo bay of a vehicle comprising:
    a storage box affixable in substantially mating engagement to the cargo bay, the storage box including a bottom, opposite sides, and a width defined between the opposite sides; and
    a conveyor belt mounted in the bottom and having a conveying surface extending substantially across the width between the opposite sides, the conveyor belt conveying articles disposed in the storage box in a pre-selected direction toward at least one of the opposite sides.

2. The storage box of claim 1 comprising a conveyor belt drive and a control in communication with the belt drive, whereby a user controls the conveyor belt with the control to convey articles toward the user regardless of the opposite end that the user is near.

3. The storage box assembly of claim 1 comprising a first control mounted near one of the opposite sides and a second control mounted near the other of the opposite sides, each of the first and second controls adapted to operate the conveyor belt.

4. The storage box assembly of claim 1 comprising a plurality of drums on which the conveyor belt is mounted.

5. The storage box assembly of claim 2 wherein the conveyor belt drive includes a motor and a drive belt, the motor adapted to scroll the drive belt in the pre-selected direction.

6. The storage box assembly of claim 5 wherein the motor includes a forward and reverse.

7. The storage box assembly of claim 3 wherein the first control is mounted near a first side of the vehicle cargo bay and the second control is mounted near an opposite side of the vehicle cargo bay.

8. The storage box assembly of claim 1 wherein the storage box includes an adjustable mounting element that adjusts a distance of the storage box from a bottom of the vehicle cargo bay.

9. The storage box assembly of claim 1 wherein the storage box includes a first door mounted at a first side of the storage box and a second door mounted at an opposite side of the storage box.

10. The storage box assembly of claim 9 wherein the conveyor belt conveys articles in the storage box toward at least one of the first door and the second door when the conveyor belt is selectively actuated by a user.

11. A vehicle utility box comprising:
    a frame including an end;
    means for mounting the frame to a vehicle cargo bay; and
    a conveyor forming a substantially continuous floor within the frame, the conveyor adapted to selectively convey articles disposed on the conveyor toward the end whereby the conveyor accumulates the articles at the end so that a user accesses the articles at the end.

12. The vehicle utility box of claim 11 wherein the frame extends between opposite sides of a vehicle cargo bay.

13. The vehicle utility box of claim 12 wherein at least one door is mounted adjacent at least one of the sides of the vehicle cargo bay.

14. The vehicle utility box of claim 13 wherein the conveyor conveys the articles disposed thereon toward and away from at least one door.

15. The vehicle utility box of claim 11 wherein the conveyor includes a belt and a tensioner adapted to keep the belt taut.

16. The vehicle utility box of claim 11 wherein the frame includes a height adjuster to adjust the position of the conveyor relative to the vehicle cargo bay.

17. The vehicle utility box of claim 11 comprising a motor that drives the conveyor.

18. The vehicle utility box of claim 17 wherein the vehicle cargo bay is a pick-up bed including opposing sides and the conveyor includes at least one actuator mounted near at least one of the opposing sides of the pick-up bed.

19. A vehicle utility box for a pick-up truck bed having a floor and opposing side panels, the utility box comprising:
    a container defining an opening and being sized and configured to mount between the opposing side panels and over the floor of the bed, the container including an end portion;
    a motorized drive assembly in the container; and
    a conveyor connected to the motorized drive assembly, the conveyor extending across the pick-up bed from one opposing side panel toward the other opposing side panel, the conveyor forming a substantially continuous floor of the container, the conveyor selectively moveable by the motorized drive assembly to convey articles disposed on the conveyor toward the container end portion, wherein conveyor accumulates the articles at the end portion so that a user can access the articles at the end portion.

* * * * *